(12) United States Patent
Shaw

(10) Patent No.: US 9,313,732 B2
(45) Date of Patent: *Apr. 12, 2016

(54) INTELLIGENT ROAMING AND INTERWORKING

(71) Applicant: AT&T Intellectual Property I, L.P., Atlanta, GA (US)

(72) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,402

(22) Filed: Jun. 20, 2014

(65) Prior Publication Data

US 2014/0302844 A1    Oct. 9, 2014

Related U.S. Application Data

(63) Continuation of application No. 13/281,031, filed on Oct. 25, 2011, now Pat. No. 8,825,106.

(51) Int. Cl.

| *H04B 7/00* | (2006.01) |
| *H04W 48/20* | (2009.01) |
| *H04W 48/00* | (2009.01) |
| *H04W 8/02* | (2009.01) |
| *H04W 48/16* | (2009.01) |
| *H04W 48/18* | (2009.01) |
| *H04W 8/18* | (2009.01) |

(52) U.S. Cl.
CPC ............... *H04W 48/20* (2013.01); *H04W 8/02* (2013.01); *H04W 48/16* (2013.01); *H04W 48/17* (2013.01); *H04W 8/18* (2013.01); *H04W 48/18* (2013.01)

(58) Field of Classification Search
CPC ..... H04W 48/18; H04W 92/02; H04W 76/02; H04W 8/005; H04W 8/10; H04W 48/20; H04W 64/003; H04W 8/06
USPC ......... 455/525, 524, 500, 517, 507, 508, 511, 455/514, 515, 432.1, 432.2, 433, 435.1, 455/435.2, 435.3, 436–444, 422.1, 403, 455/450, 550.1, 561, 562.1, 426.1, 426.2, 455/414.1–414.4; 370/328, 329, 338, 343, 370/351, 353, 356, 331, 359, 310
See application file for complete search history.

(56) References Cited

U.S. PATENT DOCUMENTS

| 2007/0149213 | A1 | 6/2007 | Lamba et al. |
| 2010/0093343 | A1 | 4/2010 | Qi et al. |
| 2010/0157946 | A1 | 6/2010 | Nasielski et al. |
| 2012/0014365 | A1 | 1/2012 | Takano et al. |
| 2012/0084246 | A1 | 4/2012 | Zhou et al. |

*Primary Examiner* — Keith Ferguson
(74) *Attorney, Agent, or Firm* — Baker & Hostetler LLP

(57) ABSTRACT

A mobile device may be configured with multiple access point names (APNs) including a roaming APN and a non-roaming APN. After a mobile device determines whether it is roaming, it may transmit a service request with the corresponding APN. The network may then select a profile based on the APN that may include quality of service parameters and other parameters for servicing the mobile device. The profile may be obtained from a local home location register or a remote home location register.

20 Claims, 13 Drawing Sheets

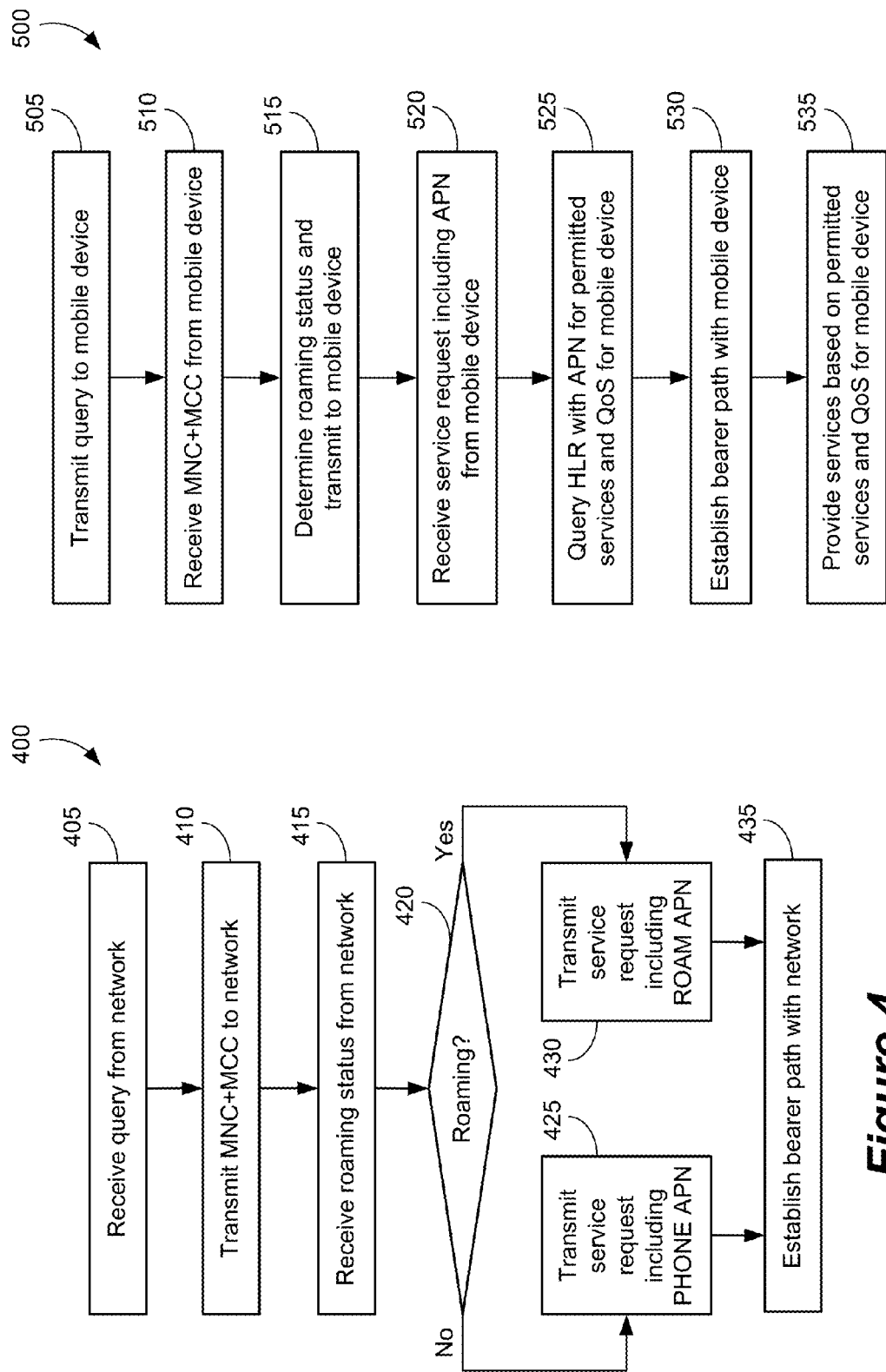

INTELLIGENT ROAMING AND INTERWORKING

CROSS-REFERENCE TO RELATED APPLICATIONS

The instant application is a continuation of, and claims priority to, U.S. patent application Ser. No. 13/281,031, filed Oct. 25, 2011. U.S. patent application Ser. No. 13/281,031 is incorporated by reference herein in its entirety.

TECHNICAL FIELD

The technical field generally relates to wireless communications and more specifically relates to roaming and interworking.

BACKGROUND

Wireless communications devices are often configured for use on both a home network and, when roaming outside the coverage area of a home network, a visiting network. The types of service and quality of service that are provided to a device that is roaming are not currently differentiated based on any information specific to, or received from, the roaming device. Therefore, visiting networks are not able to adjust their service offerings to roaming users, for example, in order to better accommodate their own users. There is also not an efficient way for a home network to determine that its users are currently roaming. These and other deficiencies of the current state of the art are addressed by the subject matter set forth herein.

SUMMARY

In an embodiment, a mobile device may be configured with two or more access point names (APNs), each of which may be intended for use with either a home network or a visiting network. The mobile device may receive a query from a wireless network for identifying information and may transmit a network code to the wireless network. In an embodiment, the network code may be a mobile network code and a mobile country code (MNC+MCC). The mobile device may receive an indication of its roaming status from the wireless network and select an APN based on the mobile device's roaming status. In an embodiment, the mobile device may also receive a confirmation that that the mobile device is eligible to use the wireless network. The mobile device may transmit a service request including the selected access point name the wireless network. The wireless network may locate a profile based on the received APN. The profile may contain parameters to be used in providing communications services to the mobile device. The wireless network may provide communications services to the mobile device based on the parameters.

In an embodiment, a network device may detect a mobile device within the coverage area of a network, send a query to the mobile device requesting mobile device identifying information, and receive mobile device identifying information from the mobile device. The mobile device identifying information maybe an MNC+MCC. The network device may determine, based on the mobile device identifying information, whether the mobile device is permitted to communicate with the network and a roaming status for the mobile device. The network device may transmit the roaming status to the mobile device and, in an embodiment, a confirmation that the mobile device is permitted to use the network. The network device may receive a service request that includes an access point name from the mobile device and may determine service parameters based on the access point name. Service parameters may be determining by obtaining a profile, or data from a profile, from a home location register (HLR). The HLR may be local to the network of the network device, or it may be remote, for example, an HLR in the home network of the mobile device where the network of the network device is a visiting network for the mobile device. The network device may establish a communications link with the mobile device and provide communications services to the mobile device based on the service parameters.

In an embodiment, a network device such as an HLR may receive a request for service parameters, where the request includes an access point name. The HLR may determine an access point name profile based on the access point name. This may be accomplished by querying a local database. Alternatively, the HLR may transmit a query to a second HLR that may be located in a different network and may receive an access point name profile, or a subset of data contained therein, from the second HLR. The HLR may store the access point name profile or profile data received from the second HLR for future use. The HLR may retrieve the service parameters from the access point name profile and provide them to the device that requested them so that the requesting device can provide communications services to a mobile device associated with the access point name. These and other aspects of the present disclosure are described in more detail herein.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 4 illustrates a non-limiting exemplary method of implementing an embodiment.

FIG. 5 illustrates another non-limiting exemplary method of implementing an embodiment.

DETAILED DESCRIPTION OF ILLUSTRATIVE EMBODIMENTS

Figure 1A:
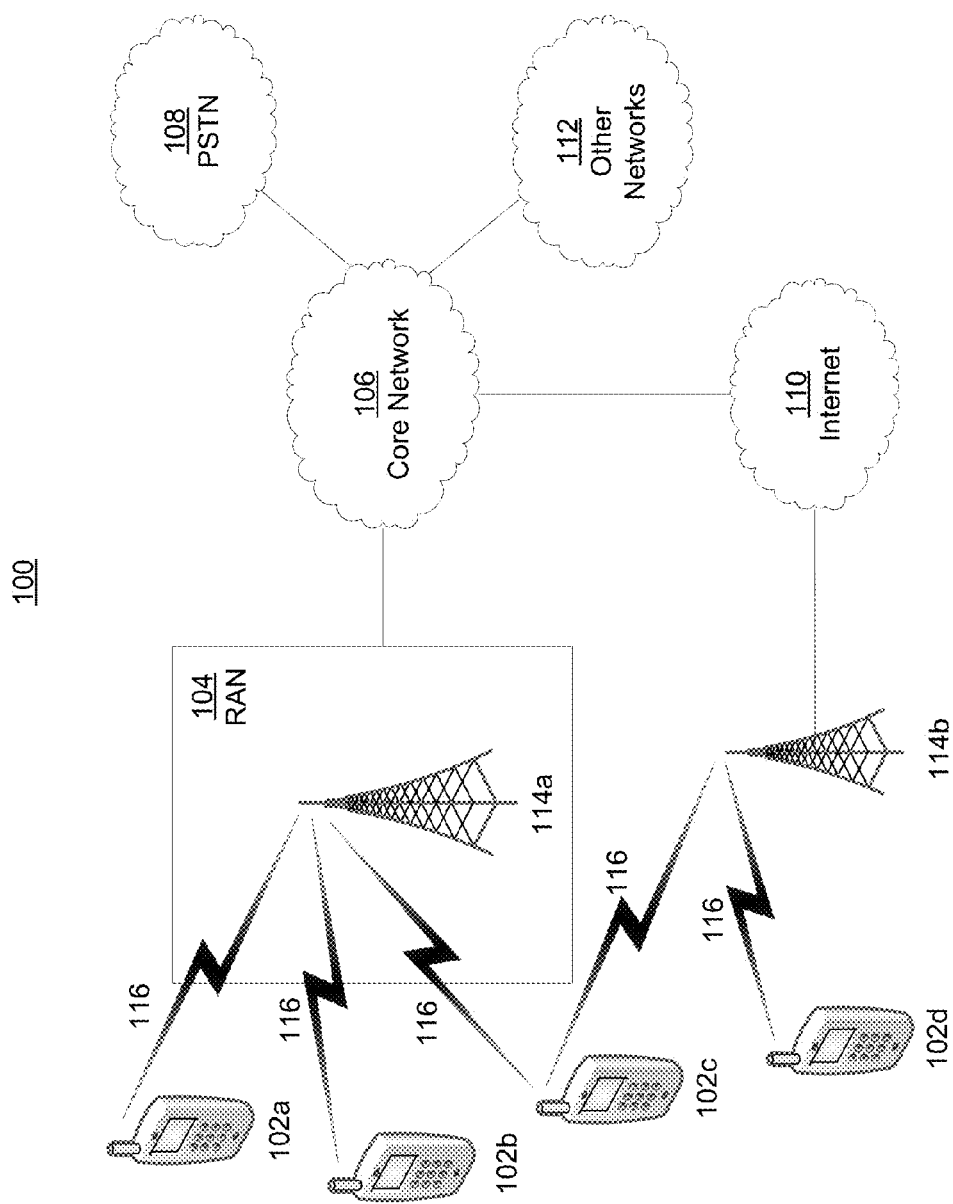
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
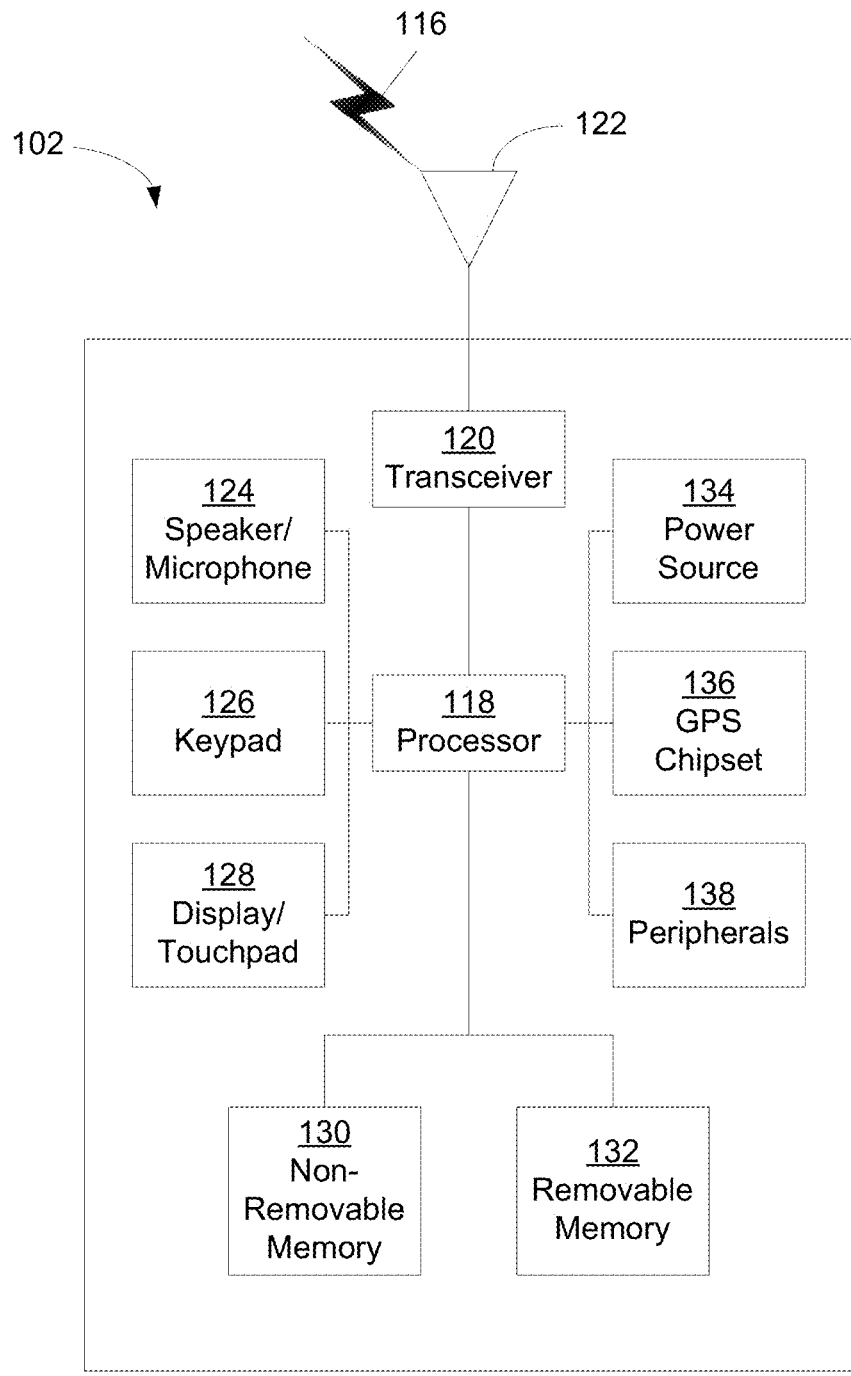
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
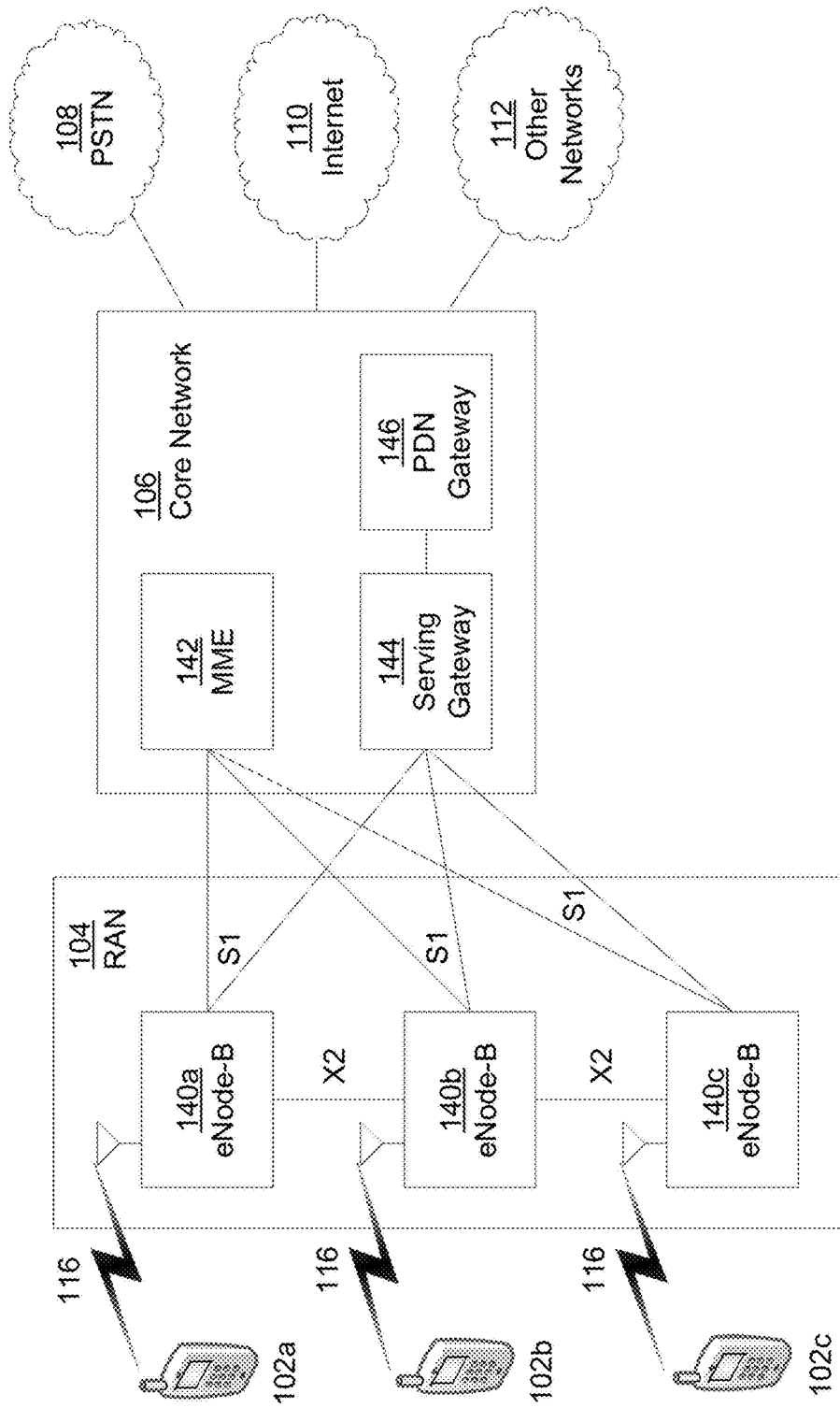
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In wireless communications systems, including those described herein and others, various means and methods may be used to identify a mobile device (referred to herein interchangeably as a wireless transmit/receive unit (WTRU) and user equipment (UE)) and determine whether that mobile device is roaming, or otherwise communicating with a network that is not its home network. The network with which a roaming device is communicating may be referred to as a visiting network. Third generation mobile telecommunications systems (commonly referred to as "3G") may use a single Serving GPRS Support Node (SGSN) IP Address to identify a roaming mobile device on a visiting network. A visiting SGSN (V-SGSN) may receive, store, and send the IP address and/or other identifying information associated with the roaming mobile device to a home gateway GPRS support node (H-GGSN) in the mobile device's home network, thereby informing the home network that the mobile device is roaming on the visiting network. The information sent to an H-GGSN in the mobile device's home network may include a radio bearer indicator (RBI), location information, and other roaming information. Upon receipt of such information, the home network may query a home location register (HLR) in the home network to determine if the mobile device is eligible for roaming service and provide the result of that determination to the visiting network. If the mobile device is eligible for roaming service, the visiting network may permit the mobile device to activate one or more packet data protocol (PDP) contexts with the V-SGSN in order to facilitate communications via the visiting network. Since such embodiments use a single SGSN IP address for the mobile device, the same types and qualities of service are provided to the mobile device whether it is roaming or on its home network In another example, a mobile device configured to operate on one or more LTE networks may be identified by a single access point name (APN) configured on the mobile device that may be referred to as a PHONE APN. An APN may include a network identifier, an operator identifier, and/or a service identifier identifying a service requested by the mobile device. The mobile device's PHONE APN may be used to set up a default bearer path in the visiting network (also referred to a visiting public land mobile network or V-PLMN) to provide roaming communications services to the mobile device. The PHONE APN may also be used to determine the types and levels of service that the mobile device is to receive. Since such embodiments use a single APN for the mobile device, the same types and levels of service are provided to the mobile device whether it is roaming or on its home network (also referred to a home public land mobile network or H-PLMN). In such an embodiment, the home network of the mobile device may not be aware of whether the mobile device is roaming or not.

Figure 2B:
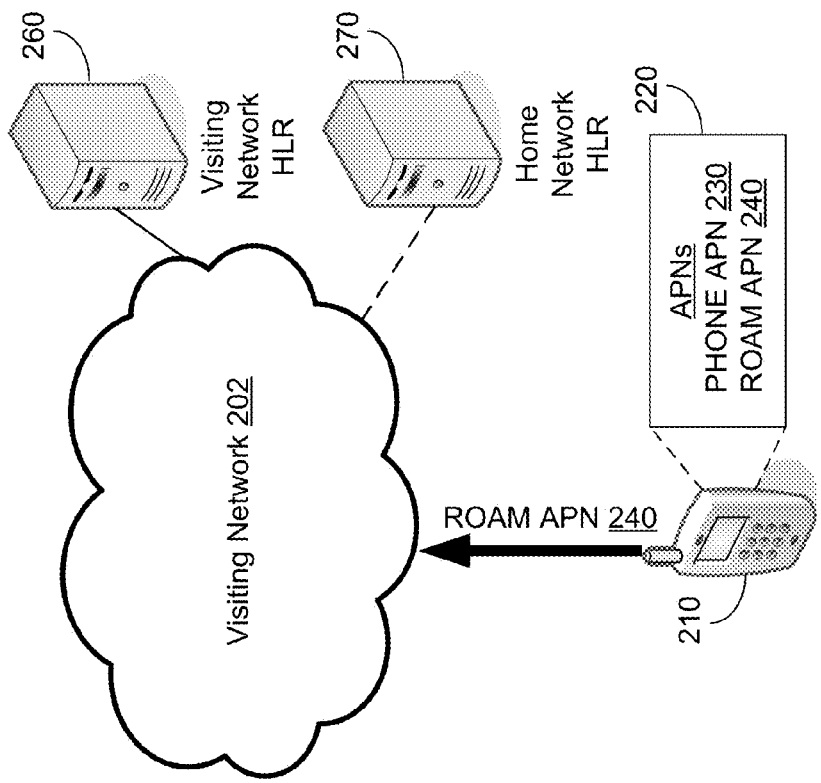
FIG. 2B illustrates a non-limiting exemplary network configuration for a device communicating with a visiting network according to an embodiment.
Figure 2A:
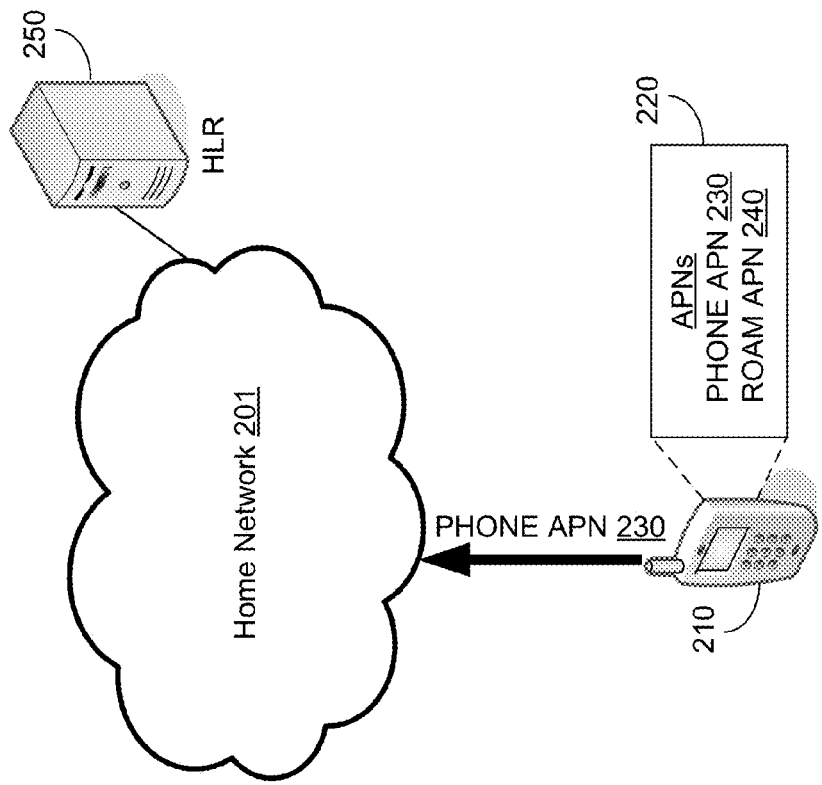
FIG. 2A illustrates a non-limiting exemplary network configuration for a device communicating with its home network according to an embodiment.

It may be desirable, however, to provide different types and/or levels of service to a mobile device depending on whether the mobile device is roaming and without involving a device such as an SGSN to determine whether a device is roaming. Therefore, in an embodiment a mobile device may be configured with two or more APNs, with at least one for use in roaming and at least one for use in the home network. FIGS. 2A and 2B illustrate exemplary, non-limiting network configurations for such embodiments.

In FIG. 2A, mobile device 210 may be configured with APNs 220. Mobile device 210, and all mobile devices described herein, may be any type of mobile communications device, including a UE or WTRU capable of operating on one or more LTE networks or any other communications network of any type. APNs 220 may include PHONE APN 230 and ROAM APN 240. When in a coverage area of home network 201, mobile device 210 may provide PHONE APN 230 to home network 201 to identify itself, set up one or more bearer paths, and may otherwise use PHONE APN 230 in communications with home network 201. Note that mobile device 210, and any mobile device described herein, may communicate directly with any network element or device in a radio access network, including, but not limited to, a base station and an eNode-B. In an embodiment, mobile device 210 may determine whether home network 201 is a home network or a visiting network by any means, including receiving a roaming indication from home network 201, detecting a radio bearer of home network 201, and/or determining a network identity from a radio bearer. Home network 201 may determine, directly or indirectly, the service types and qualities permitted to mobile device 210 based on the PHONE APN and/or one or more profiles associated with PHONE APN as described in more detail herein. In an embodiment, home network 201 may obtain the service types and qualities permitted to mobile device 210 from HLR 250 that may be located within and/or communicatively connected to home network 201.

In FIG. 2B, mobile device 210 is also configured with APNs 220 that may include PHONE APN 230 and ROAM APN 240. Here, mobile device 210 may have determined that visiting network 202 is a visiting network by any means, including receiving a roaming indication from visiting network 202, detecting a radio bearer of visiting network 202, and/or determining a network identity from a radio bearer. Upon such a determination, mobile device 210 may use ROAM APN 240 to identify itself, set up one or more bearer paths, and may otherwise use ROAM APN 240 in communications with visiting network 202. Visiting network 202 may determine, directly or indirectly, the service types and qualities permitted to mobile device 210 based on the ROAM APN and/or one or more profiles associated with ROAM APN as described in more detail herein. In an embodiment, visiting network 202 may obtain the service types and qualities permitted to mobile device 210 from visiting network HLR 260 that may be located within and/or communicatively connected to visiting network 202. HLR 260 may obtain service types and qualities permitted to mobile device 210 from an HLR associated with the home network of mobile device 210, such as HLR 270 that may be communicatively connected to visiting network 202 via, for example, home network 201. Alternatively, visiting network 202 may obtain the service types and qualities permitted to mobile device 210 from home network HLR 270 that may be communicatively connected to visiting network 202 via, for example, home network 201, or may be located within and/or communicatively connected to visiting network 202.

Figure 3:
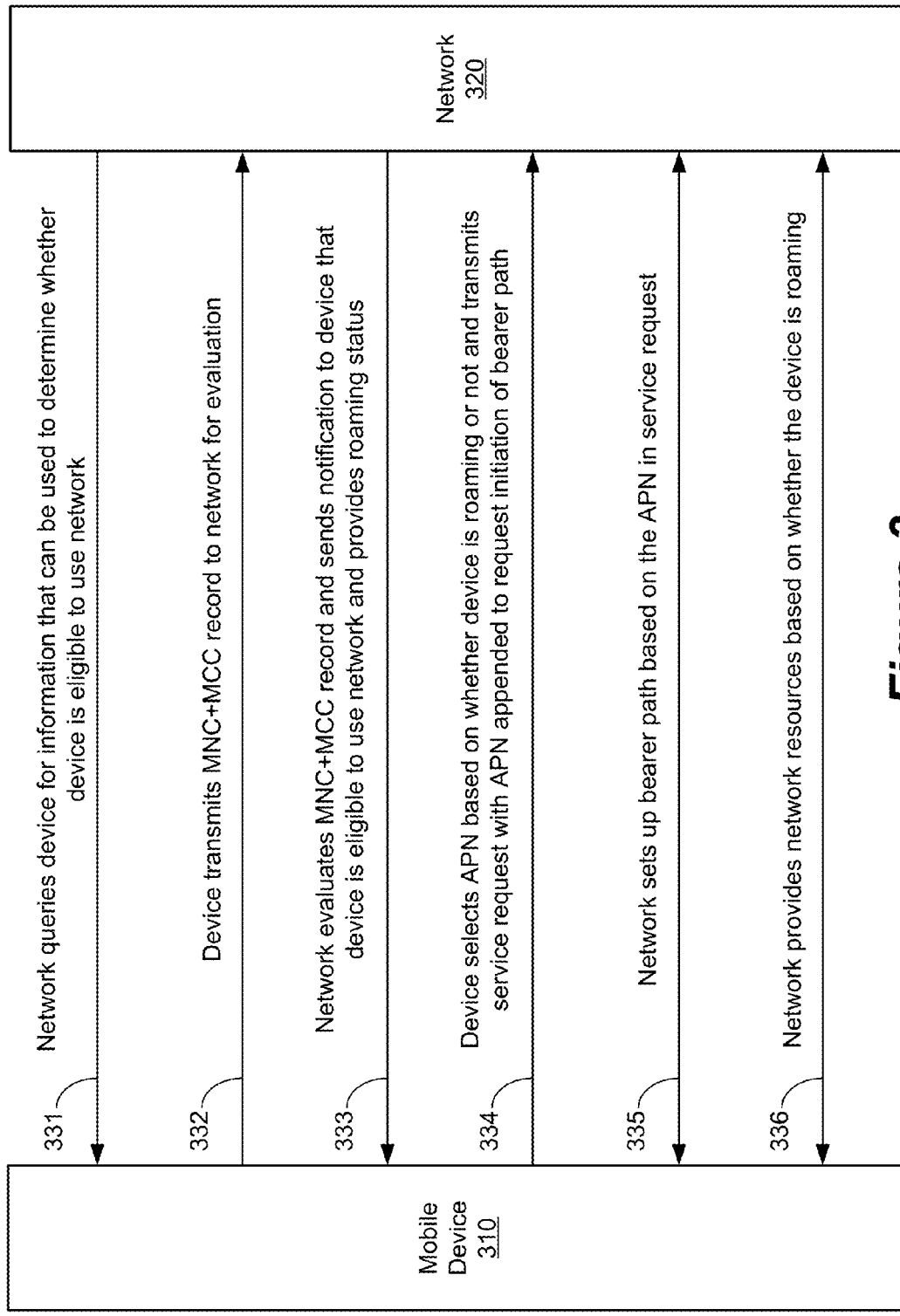
FIG. 3 illustrates a non-limiting exemplary signal flow according to an embodiment.

FIG. 3 illustrates exemplary non-limiting signal flows that may be used according to an embodiment. In the illustrated embodiment, mobile device 310 may be in a coverage area serviced by network 320. Network 320 may be a home network or a visiting network. Note that, as used herein, "network 320" may refer to the entirety of network 320, any network device within network 320, any component of network 320, or any combination thereof. Upon detection of mobile device 310, at signal 331 network 320 may query mobile device 310 to obtain information that network 320 may use to determine whether the device is eligible to use network 320. Such a query may be specifically for device identifying information, such as mobile device 310's mobile network code (MNC) and mobile country code (MCC) that when taken together (MNC+MCC) provide a unique identifier for a carrier or communications provider associated with mobile device 210. At signal 332, mobile device 310 may transmit its MNC+MCC to network 320. Note that any alternate or additional identifying information is contemplated, as is other methods and means of determining whether mobile device 310 is eligible to use network 320.

Network 320 may evaluate the received MNC+MCC or alternate information and determine that mobile device 310 is eligible to use network 320. Network 320 may also use the received MNC+MCC and/or other information to determine whether mobile device 310 is roaming, i.e., whether network 320 is a home network (e.g., received MNC+MCC corresponds to or otherwise identifies network 320) or a visiting network (e.g., received MNC+MCC does not correspond to or otherwise identify network 320) for mobile device 310. Network 320 may transmit signal 333 to mobile device 310 indicating that mobile device 310 is eligible to use network 320 and/or whether mobile device 310 is roaming.

If the roaming status received in signal 333 indicates that mobile device 310 is roaming, mobile device 310 may select a ROAM APN configured in mobile device 310. Alternatively, if the roaming status received in signal 333 indicates that mobile device 310 is not roaming, mobile device 310 may select a PHONE APN configured in mobile device 310. Mobile device 310 may then transmit a service request to initiate one or more bearer paths to network 320 that includes the selected APN. The selected APN may be appended to the service request or otherwise included in the service request.

At signal 335, mobile device 310 and network 320 may exchange any information necessary to set up one or more bearer paths, and, in an embodiment, network 320 may determine bearer path parameters and other parameters based on information determined at least in part on the APN provided in signal 334. At signal 336, network resources may be used to provide service to mobile device 310. In an embodiment, the provision and use of such network resources may be based on parameters and other data obtained, at least in part, on the APN provided in signal 334. The type and quality of service provided may be those that mobile device 310 is eligible to receive based on a profile associated with the APN provided in signal 334. Embodiments that network 320 may use to determine the type and quality of service are described in more detail herein.

FIG. 4 illustrates an exemplary method 400 that may be performed by a mobile device in an embodiment. Note that the activities and functions described in regard to method 400 and any other method disclosed herein may be performed in any order, and any subset of such activities and functions may be performed in any embodiment without requiring the performance of any other activities or functions disclosed herein. Note also that additional activities and functions may be combined and/or performed with the any of the disclosed activities and functions and all such embodiments are contemplated as within the scope of the present disclosure.

At block 405, a mobile device may receive a query from a network providing coverage to an area in which the mobile device is currently located. The query may be a query for any identifying information, including, but not limited to, an MNC+MCC configured on the mobile device. At block 410, the mobile device may transmit its MNC+MCC to the querying network. Alternatively, at block 410 the mobile device may transmit any other identifying information or any other type of response to the querying network. At block 415, the mobile device may receive its roaming status from the network. Any other information may be received from the network at block 415, including a confirmation that the mobile device is permitted to use the network.

At block 420, the mobile device may determine whether the mobile device is roaming or not (i.e., whether the network currently providing coverage is a home network or a visiting network) based on the information received at block 415. If the mobile device is not roaming, at block 425 the mobile device may transmit a service request including a PHONE APN configured on the mobile device to the network. If the mobile device is roaming, at block 430 the mobile device may transmit a service request including a ROAM APN configured on the mobile device to the network. Either service request may be a request to establish a bearer path with the network in order to facilitate any type of communications between the network and the mobile device. Whether the mobile device is roaming or not, at block 435 the mobile device may take any actions and transmit and/or receive any communications that may be used to establish a bearer path between the mobile device and the network. The network resources that are allocated for the mobile device may be determined by the network based on the roaming status of the mobile device and/or on the APN provided by the mobile device to the network, as described in more detail herein.

FIG. 5 illustrates an exemplary method 500 that may be performed by a network, or any of one or more devices within a network, according to an embodiment. At block 505, a network may query a mobile device detected within its coverage area for information that may allow the network to determine if the mobile device is permitted to establish communications with the network and/or if the mobile device is roaming or not (i.e., whether the network is a home network or a visiting network for the mobile device.) The query may be a query for any identifying information, including, but not limited to, an MNC+MCC configured on the mobile device. At block 510, the network may receive a MNC+MCC from the mobile device. Alternatively, at block 510 the network may receive any other identifying information or any other type of response from the mobile device. At block 515, the network may determine the roaming status of the mobile device based on MNC+MCC. For example, the network may determine whether the carrier or communications provider associated with the MNC+MCC is the operator of the network (thus indicating that the network is a home network for the mobile device) or a carrier or communications provider associated with the MNC+MCC is a carrier or communications provider that has an established roaming agreement with the network (thus indicating that the network is a visiting network for the mobile device and the mobile device is permitted to roam on the network.) The roaming status of the mobile device, and any other information such as a confirmation that the mobile device is permitted to use the network, may be transmitted to the mobile device at block 515. Any other information may be transmitted to the mobile device at block 515.

At block 520, the network may receive a service request from the mobile device that includes an APN that, in an embodiment, may be either a PHONE APN or a ROAM APN. At block 525, the network may query an HLR, providing the HLR with the APN, to determine the network resources, services, and quality of service (QoS) to be provided to the mobile device. In an embodiment, the network may be a home network and may have received a PHONE APN from the mobile device at block 520. In such an embodiment, the HLR queried may be an HLR within the network. Alternatively, the network may be a visiting network and may have received a ROAM APN from the mobile device at block 520. In such an embodiment, the network may query an HLR in the mobile device's home network by sending a query directly to an HLR in the home network. Alternatively, the network may query one or more of its own HLRs. In this embodiment, one or more of the network's HLRs may have stored a profile for the mobile device or a profile that can be used for the mobile device that is associated with the APN provided to the network by the mobile device. Alternatively, one or more of the network's HLRs may, upon receiving a query from the network, transmit a query to an HLR of the mobile device's home network and retrieve the network resources, services, and QoS to be provided to the mobile device. Such an HLR may store these network resources, services, and QoS to be provided to the mobile device for use in the future when the mobile device may again attempt to connect to the network.

Note that the network need not be aware of a type of the APN (e.g., PHONE APN or ROAM APN) received from a mobile device, for example at block 520. While the network may be aware of the roaming status of the mobile device based on the received MNC+MCC or other information, the roaming status may not be used to determine the network resources, services, and QoS to be provided to the mobile device. Rather, the network may use the APN received from the mobile device to obtain a profile for the mobile device that contains the network resources, services, and QoS to be provided to the mobile device. Each APN configured on the mobile device may be associated with a distinct profile, as described in more detail herein.

At block 530, the network may establish a bearer path with the mobile device, and at block 535, the network may provide services to the mobile device in accordance with the network resources, services, and QoS determined for the mobile device.

Figure 6:
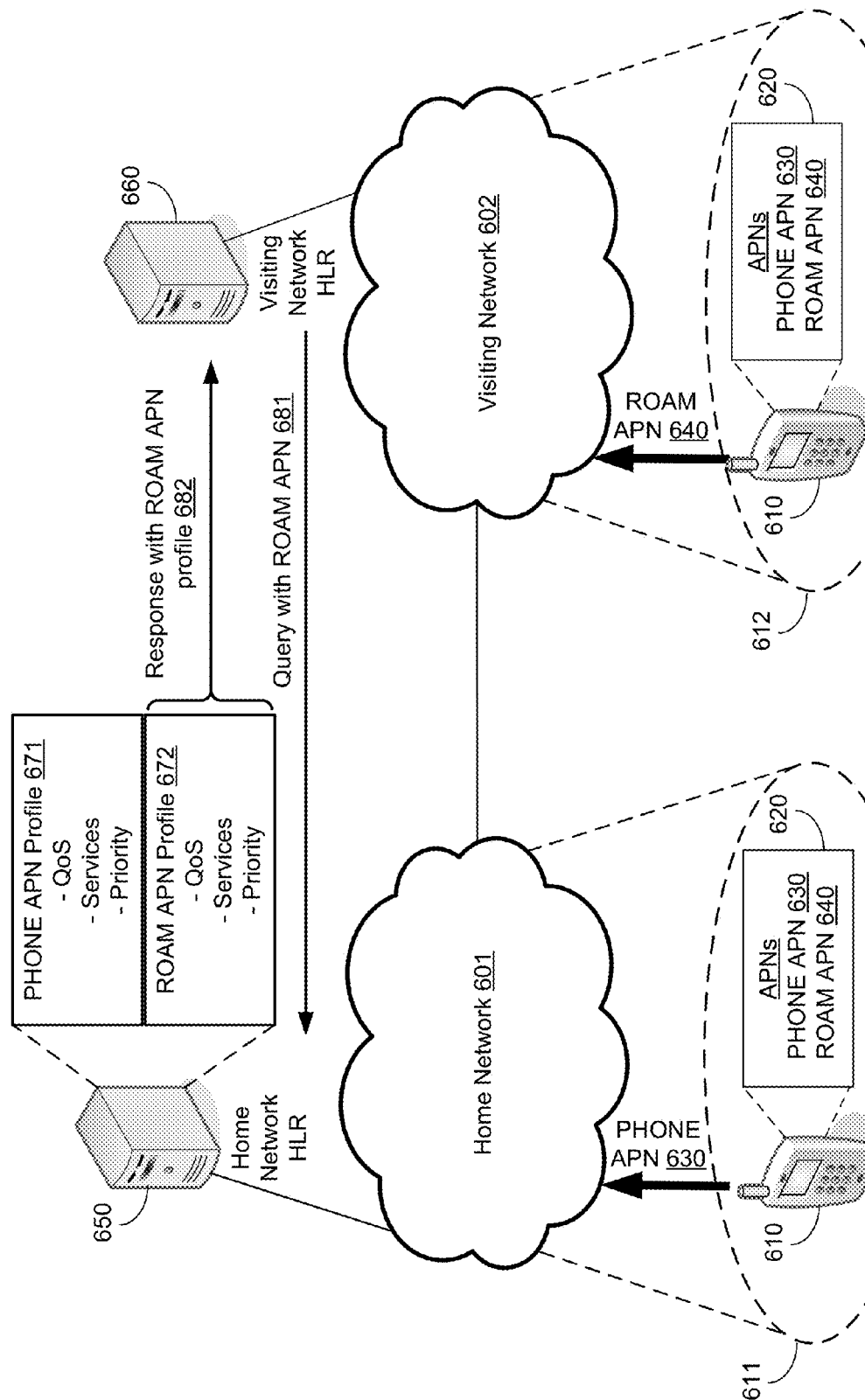
FIG. 6 illustrates a non-limiting exemplary network configuration for a device communicating with a visiting network and a home network according to an embodiment.

FIG. 6 illustrates an exemplary, non-limiting network environment in which an embodiment of the present disclosure may be implemented. Mobile device 610 may communicate with home network 601 when in home network 601's coverage area 611. Mobile device 610 may be configured with APNs 620 that may include PHONE APN 630 and ROAM APN 640. When mobile device 610 determines that it is communicating with home network 601, it may transmit a service request including PHONE APN 630 to home network 601. Home network 601 may then query home network HLR 650 for the network resources, services, and QoS that are to be used for the communications link with mobile device 610. The query sent to home network HLR 650 may include PHONE APN 630 provided to home network 601 in the service request transmitted by mobile device 610.

Upon receiving the query, home network HLR 650 may perform a database look-up or otherwise determine that profile 671 is associated with PHONE APN 630. Home network HLR 650 may then provide the associated QoS parameters, services, and priorities that home network 601 is to use in providing communications services to mobile device 610. Home network 601 may provide communications services to mobile device 610 based on these QoS parameters, services, and priorities.

When mobile device 610 is in coverage area 612 of visiting network 602, mobile device 610 may transmit a service request including ROAM APN 640 to visiting network 602. Visiting network 602 may then query visiting network HLR 660 for the network resources, services, and QoS that are to be used for the communications link with mobile device 610. The query sent to visiting network HLR 660 may include ROAM APN 640 provided to visiting network 602 in the service request transmitted by mobile device 610. Visiting network HLR 660 may transmit query 681 for network resources, services, and QoS parameters to home network HLR 650. Query 681 may include ROAM APN 640 as provided to visiting network 602 in the service request transmitted by mobile device 610. Home network HLR 650 may perform a database look-up or otherwise determine that profile 672 is associated with ROAM APN 640. Home network HLR 650 may then provide the associated QoS parameters, services, priorities, and/or any other information that may be used to establish and provide communications services that visiting network 602 is to use in providing communications services to mobile device 610 in response 682. Visiting network HLR 660 may provide such communications services information to visiting network 602 that may set up and provide communications services to mobile device 610 using the received communications services information.

In an embodiment, visiting network HLR 660 may store the received QoS parameters, services, and priorities and/or other communications services information for use in servicing further service requests from mobile device 610, thereby reducing network resource usage in the future should mobile device 610 again attempt to communicate with visiting network 602. Alternatively, visiting network HLR 660 may obtain APN profiles in advance from home network HLR 650 or from any other device associated with home network 601. For example, upon establishing a roaming agreement between home network 601 and visiting network 602, devices within these networks may be configured to maintain current APN profiles so that they can more expediently service roaming devices. Any other means or methods of determining an APN profile, or elements thereof, may be used and are contemplated as within the scope of the present disclosure.

Note that upon receiving a request for an APN profile from visiting network HLR 660, home network HLR 650 may record or otherwise store an indication that mobile device 610 is currently roaming Such an indication may include a date and time indicating when mobile device 610 is roaming, the network on which mobile device 610 is roaming, and any other information that may be used for any purpose by home network 601.

APN profiles may contain any data and/or parameters that may be used to provide service to a mobile device. Such parameters and data may include data rates, QoS parameters, priorities for various traffic types, times and/or dates when certain parameters are to be used, etc.

Figure 7:
FIG. 7 illustrates another non-limiting exemplary signal flow according to an embodiment.

FIG. 7 illustrates exemplary non-limiting method 700 that may be performed by a home network HLR or another network device according to an embodiment. At block 705, the home network HLR may receive a query for QoS parameters, services, priorities, and/or any other information that may be used by a network to facilitate communications with a mobile device. The query may include an APN that has been provided to the home network. This query may come from a device within the home network itself, for example when attempting to establish a bearer path for and provide communications services to a mobile device within the mobile device's home network coverage area. Alternatively, this query may be received from a device in a visiting network that is attempting to provide roaming communications service to a mobile that is within the coverage area of the visiting network.

At block 710, the home network HLR may determine a profile associated with the received APN. This may be accomplished using any means, including a database look-up based on the APN. At block 715, the home network HLR may provide the profile in its entirety, the data within the profile, or a subset of the data within the profile to the device that transmitted the query.

Figure 8:
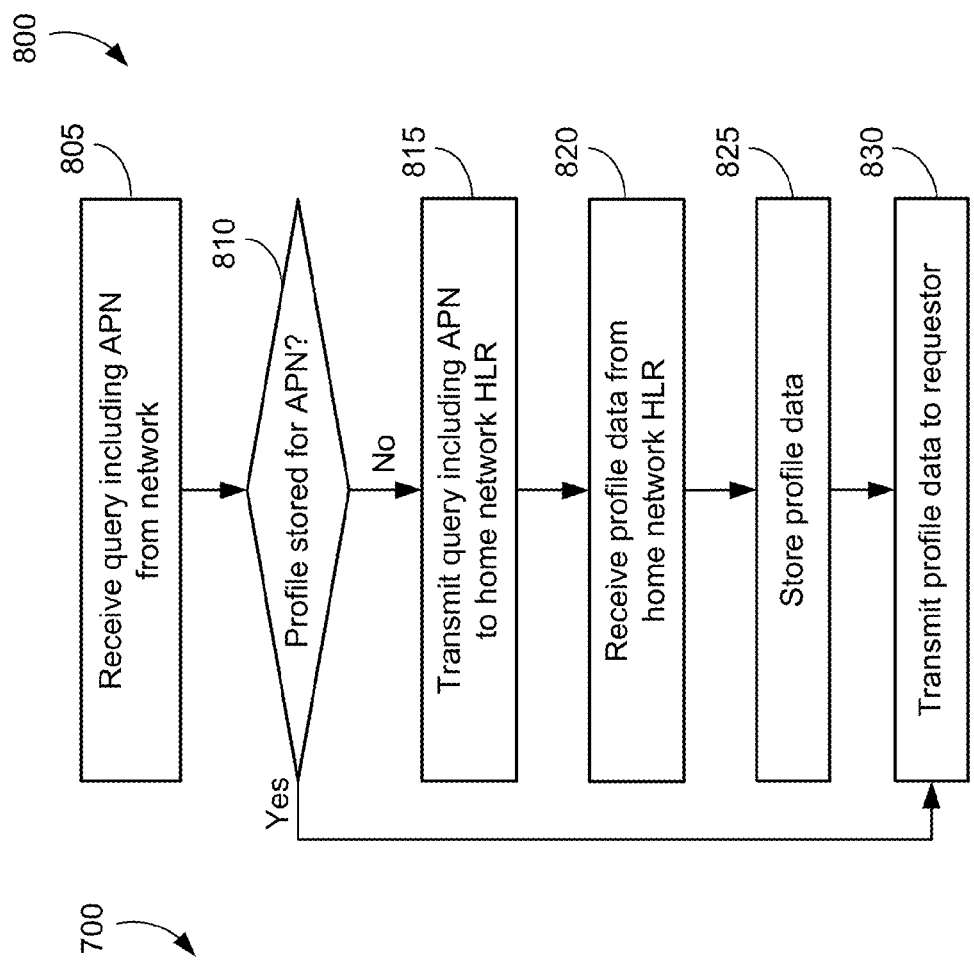
FIG. 8 illustrates another non-limiting exemplary method of implementing an embodiment.

FIG. 8 illustrates exemplary non-limiting method 800 that may be performed by a visiting network HLR or another network device according to an embodiment. At block 805, the visiting network HLR may receive a query from the visiting network for QoS parameters, services, priorities, and/or any other information that may be used by a network to facilitate communications with a mobile device. The query may include an APN that has been provided to the visiting network. At block 810, the visiting network HLR may determine whether it has a stored APN profile associated with the received APN. For example, the visiting network HLR may have previously received one or more APN profiles from a home network HLR or other device and stored them If it does, at block 830 the visiting network HLR may transmit the profile associated with the received APN in its entirety, the data within the profile, or a subset of the data within the profile to the visiting network device that transmitted the query.

If the visiting network HLR does not have a profile associated with the received APN, at block 815 the visiting network HLR may transmit a request for APN profile data to a home network HLR associated with the home network of the mobile device. The visiting network HLR may determine the home network from the APN, which may include a network identifier and/or an operator identifier. Alternatively, the visiting network HLR may determine the home network from an MNC+MCC that the mobile device may have provided, and which may have been transmitted to the visiting network HLR with the query received at block 805. Any other means and methods of determining a home network and/or a home network HLR for the purposes of retrieving APN profile data is contemplated as within the scope of the present disclosure.

A response to the request for APN profile data may be received at block 820. The response may contain any data that may be used to provide service to a roaming device, including, but not limited to, QoS parameters, services, and priorities. At block 825, the profile and/or a subset of data associated therewith may be stored by the visiting network HLR for use in the future. At block 830, the visiting network HLR may transmit the profile associated with the received APN in its entirety, the data within the profile, or a subset of the data within the profile to the visiting network device that transmitted the query.

Note that APNs as described herein may each be unique and configured for a single device. For example, each mobile device configured according to an embodiment of the present disclosure may have a single unique APN for roaming (ROAM APN) and a single unique APN for communication with a home network (PHONE APN). Thus, there may be one profile for each unique APN. Alternatively, the APNs configured on mobile devices may be more general. For example, a carrier may provide one PHONE APN and one ROAM APN for use by all or a plurality of its customers' devices. In another alternative, each mobile device may have more than one ROAM APN and/or more than one PHONE APN. For example, a device may have one APN per particular service that the device may request, such as one data access APN for roaming, one data access APN for use with a home network, one voice APN for roaming, and/or one voice APN for use with a home network. Alternatively, or in addition, APNs may be used according to when a service request is generated. For example, a mobile device may select a first PHONE APN when communicating with a home network during one time period during the day, and a second PHONE APN when communicating with the home network during a different time period during the day. In an embodiment, one section of an APN may be used to indicate roaming or home network communications. For example, part of the operator identifier may be reserved for indicating roaming status. Alternatively, codes within an APN may be used to indicate roaming status that are carrier specific. For example, one carrier may use one APN format with codes that indicate roaming status while another carrier may use a different format and/or codes for APNs that indicate roaming status. Any combination of these and all other variations of APN configurations are contemplated as within the scope of the present disclosure.

Note also that the APN profiles as described herein may be dynamic. For example, an HLR may adjust the data within an APN profile based on certain criteria, such as time of day, time of week, current network traffic loads, resources used by the mobile device associated with the APN profile, user requests for alteration of the APN profile, etc.

The methods and systems described above assist in efficiently providing the appropriate resources and quality of service to both roaming and non-roaming mobile devices. By implementing the present disclosure, the user experience may be improved. Set forth below are further exemplary systems, devices, and components in which aspects of intelligent roaming and interworking may be implemented.

Figure 9:
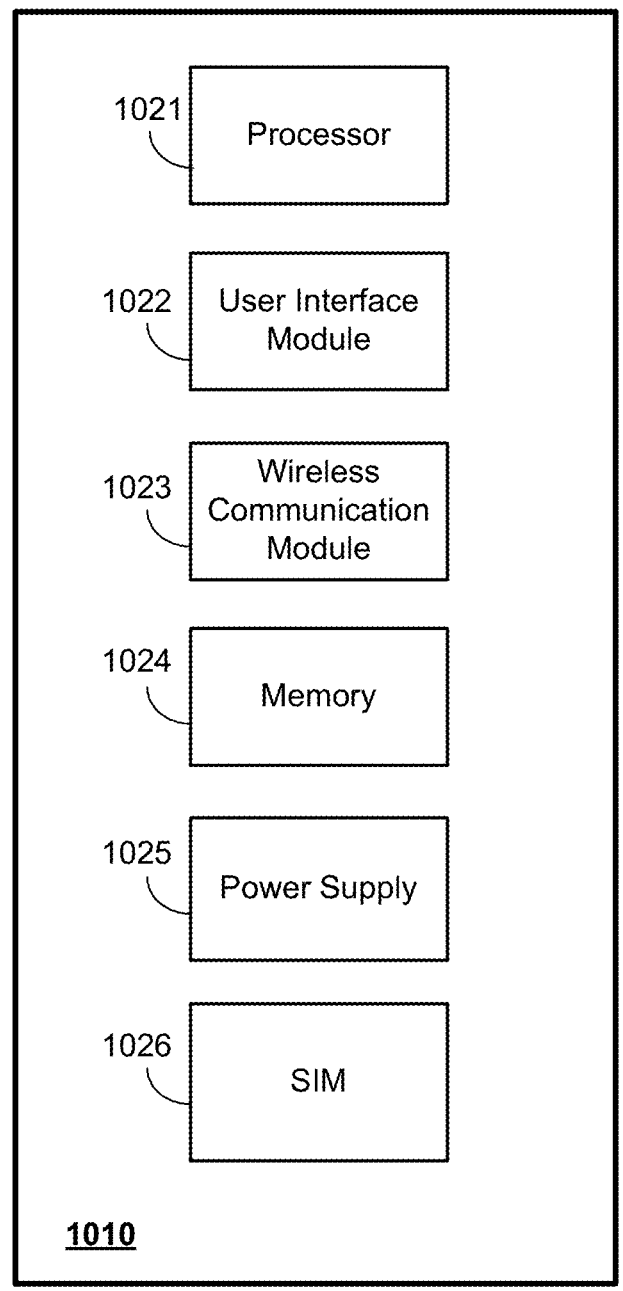
FIG. 9 is a block diagram of a non-limiting exemplary mobile device in which intelligent roaming and interworking may be implemented.

FIG. 9 illustrates an example wireless device 1010 that may be used in connection with an embodiment. References will also be made to other figures of the present disclosure as appropriate. For example, mobile devices 210, 310, and/or 610 may be wireless devices of the type described in regard to FIG. 9, and may have some, all, or none of the components and modules described in regard to FIG. 9. It will be appreciated that the components and modules of wireless device 1010 illustrated in FIG. 9 are illustrative, and that any number and type of components and/or modules may be present in wireless device 1010. In addition, the functions performed by any or all of the components and modules illustrated in FIG. 9 may be performed by any number of physical components. Thus, it is possible that in some embodiments the functionality of more than one component and/or module illustrated in FIG. 9 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to efficient processing of radio resource requests, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 10:
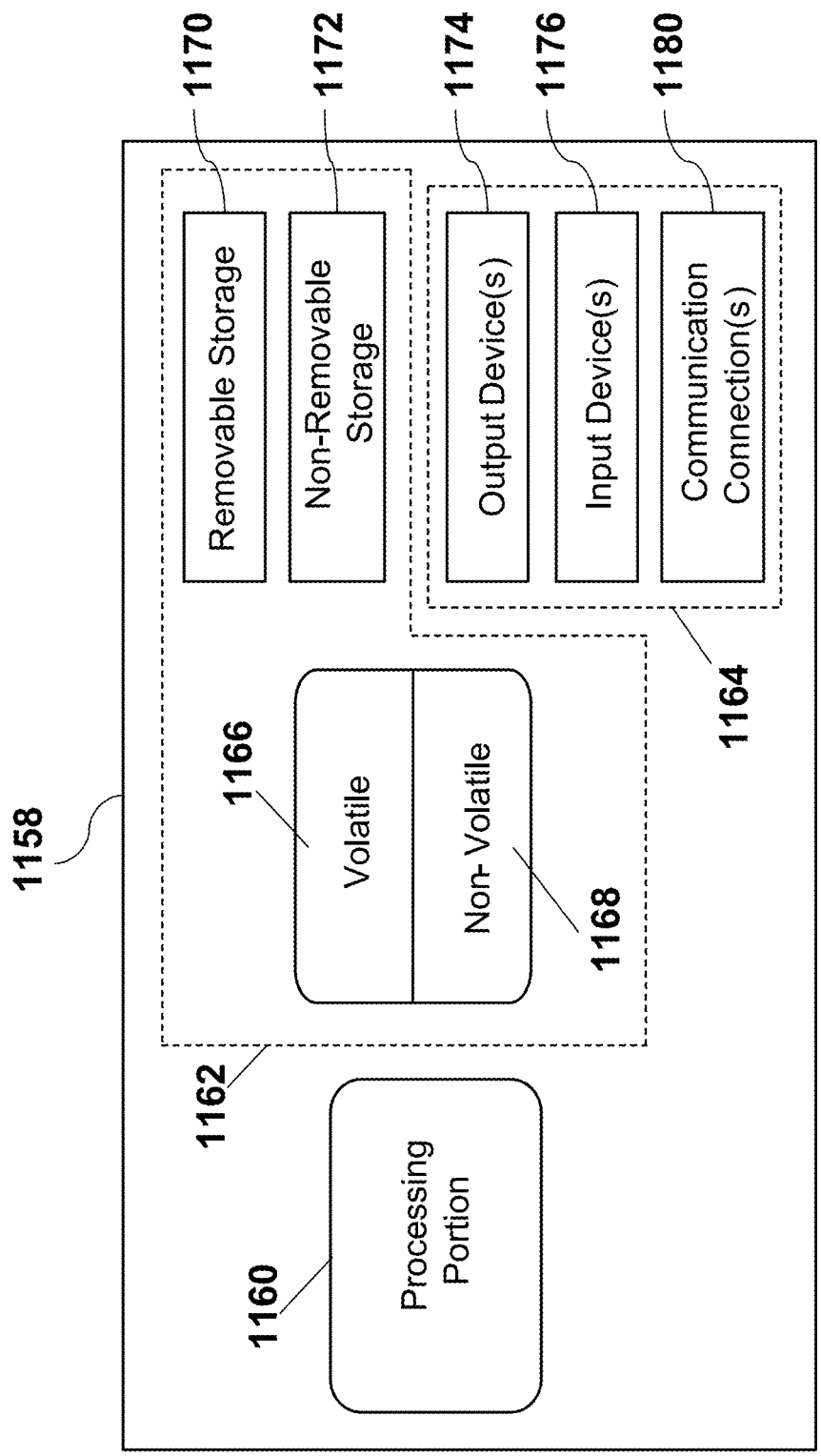
FIG. 10 is a block diagram of a non-limiting exemplary processor in which intelligent roaming and interworking may be implemented.

FIG. 10 is a block diagram of an example processor 1158 which may be employed in any of the embodiments described herein, including as one or more components of mobile devices 210, 310, and 610, as one or more components of network equipment or related equipment, and/or as one or more components of any third party system or subsystem that may implement any portion of the subject matter described herein. It is emphasized that the block diagram depicted in FIG. 10 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 10, the processor 1158 comprises a processing portion 1160, a memory portion 1162, and an input/output portion 1164. The processing portion 1160, memory portion 1162, and input/output portion 1164 are coupled together (coupling not shown in FIG. 10) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive data access request data and responses, transmit, receive, store and process text, data, and voice communications, execute software that efficiently processes radio resource requests, receive and store radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, radio resource requests, software for an efficient radio resource request processing system, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how intelligent roaming and interworking may be implemented with stationary and non-stationary network structures and architectures in order to provide efficient processing of radio resource requests. It can be appreciated, however, that intelligent roaming and interworking as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, intelligent roaming and interworking may be applied independently of the method of data transport, and does not depend on any particular network architecture, or underlying protocols.

Figure 11:
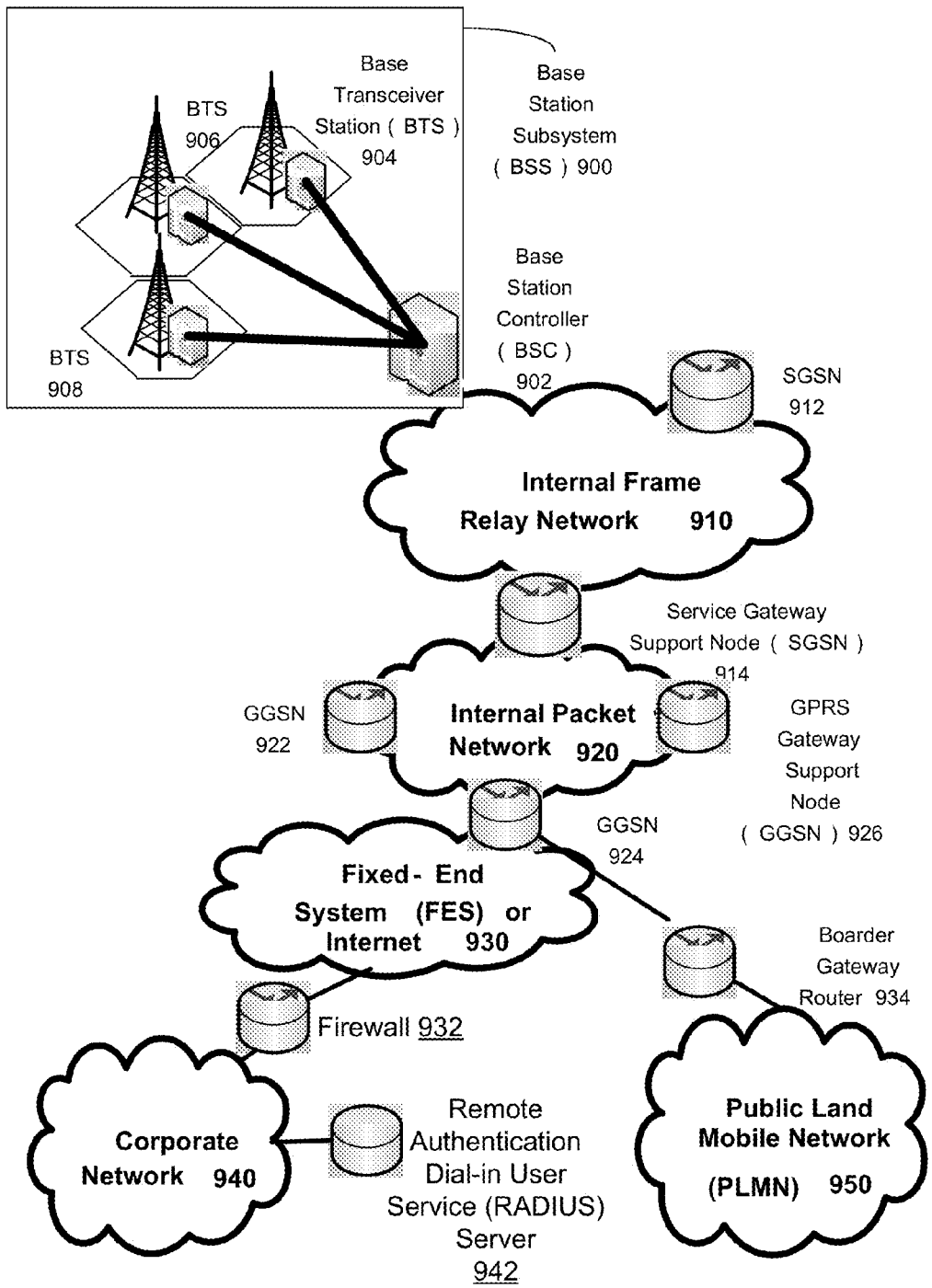
FIG. 11 is a block diagram of an non-limiting exemplary packet-based mobile cellular network environment, such as a GPRS network, in which intelligent roaming and interworking may be implemented.

FIG. 11 depicts an overall block diagram of an exemplary packet-based mobile cellular network environment, such as a GPRS network, in which intelligent roaming and interworking systems and methods such as those described herein may be practiced. In an example configuration, any RAN as described herein may be encompassed by or interact with the network environment depicted in FIG. 11. Similarly, mobile devices 210, 310, and 610 may communicate or interact with a network environment such as that depicted in FIG. 11. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 210, 310, and 610) become connected to the wireless network. In exemplary fashion, the packet traffic originating from user devices (e.g., mobile devices 210, 310, and 610) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 12:
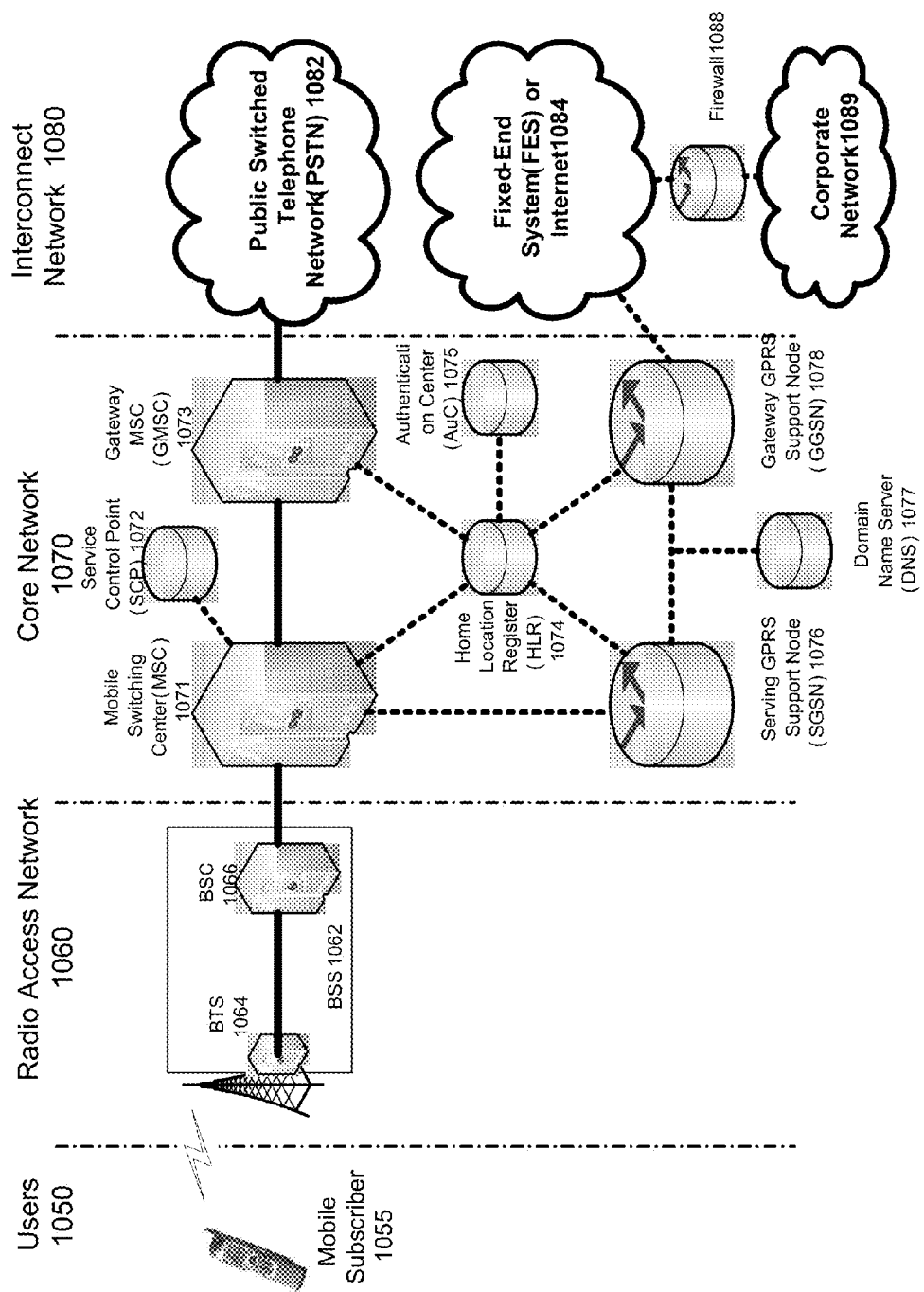
FIG. 12 illustrates a non-limiting exemplary architecture of a typical GPRS network, segmented into four groups, in which intelligent roaming and interworking may be implemented.

FIG. 12 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 12). In an example embodiment, the device depicted as mobile subscriber 1055 may comprise any of mobile devices 210, 310, and 610. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 12, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles as describe herein and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 210, 310, and 610, used by an end user of a mobile cellular service or a wireless provider. When a mobile subscriber turns on his or her mobile device, the mobile device may go through an attach process by which the mobile device attaches to an SGSN of the GPRS network. In FIG. 12, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of intelligent roaming and interworking systems and methods such as those described herein may include, but are not limited to, Gateway GPRS Support Node tables, Fixed End System router tables, firewall systems, VPN tunnels, and any number of other network elements as required by the particular digital network.

Figure 13:
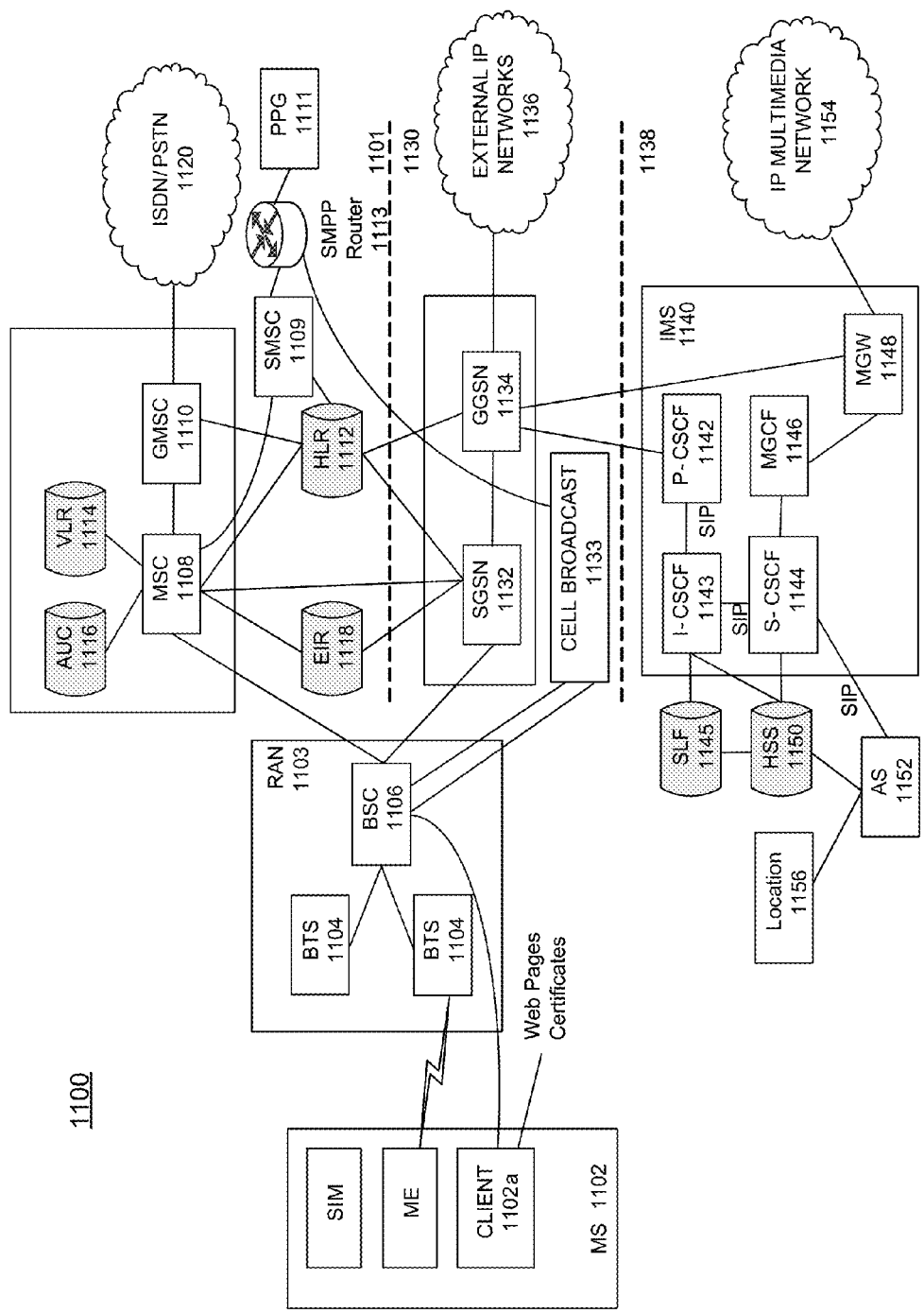
FIG. 13 illustrates a non-limiting alternate block diagram of an exemplary GSM/GPRS/IP multimedia network architecture in which intelligent roaming and interworking may be implemented.

FIG. 13 illustrates another exemplary block diagram view of a GSM/GPRS/IP multimedia network architecture 1100 in which the systems and methods for intelligent roaming and interworking such as those described herein may be incorporated. As illustrated, architecture 1100 of FIG. 13 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 210, 310, and 610) that is used by mobile subscribers, in one embodiment with a Subscriber identity Module (SIM). The SIM includes an International Mobile Subscriber Identity (IMSI), which is a unique identifier of a subscriber. The SIM may also include APNs, such as a PHONE APN and a ROAM APN as described herein. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles as described herein. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSCNLR, via BTS 1104 and BSC 1106. The location information may then be sent to the MS's HLR. The HLR may be updated with the location information received from the MSCNLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods intelligent roaming and interworking have been described in connection with various communications devices and computing devices/processors, the underlying concepts can be applied to any communications or computing device, processor, or system capable of implementing the intelligent roaming and interworking systems and methods described. The various techniques described herein may be implemented in connection with hardware or software or, where appropriate, with a combination of both. Thus, the methods and apparatuses for intelligent roaming and interworking, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for intelligent roaming and interworking. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for intelligent roaming and interworking may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for intelligent roaming and interworking. When implemented on a general-purpose processor, the program code combines with the processor to provide a unique apparatus that operates to invoke the functionality of intelligent roaming and interworking as described herein. Additionally, any storage techniques used in connection with an intelligent roaming and interworking system may invariably be a combination of hardware and software.

While intelligent roaming and interworking systems and methods have been described in connection with the various embodiments of the various figures, it is to be understood that other similar embodiments may be used or modifications and additions may be made to the described embodiments for performing the same function of intelligent roaming and interworking without deviating therefrom. For example, one skilled in the art will recognize that intelligent roaming and interworking as described in the present application may apply to any environment, whether wired or wireless, and may be applied to any number of such devices connected via a communications network and interacting across the network. Therefore, intelligent roaming and interworking should not be limited to any single embodiment, but rather should be construed in breadth and scope in accordance with the appended claims.

What is claimed:

1. A mobile device comprising;
a processor; and
memory coupled to the processor, the memory comprising executable instructions that when executed by the processor, cause the processor to effectuate operations comprising:
receiving a request for identifying information;
generating, responsive to the request, identifying information;
providing the generated identifying information;
receiving, responsive to providing the generated identifying information, a roaming status;
selecting, based on the roaming status, an access point name from a plurality of access point names;
providing a service request comprising the selected access point name; and
receiving an indication of an established communication link based on service parameters associated with the selected access point name.

2. The mobile device of claim 1, wherein the identifying information comprises at least one of a mobile network code or a mobile country code.

3. The mobile device of claim 1, wherein the service parameters are determined via a query, comprising the access point name, to a home location register.

4. The mobile device of claim 3, wherein the home location register is in a first network and the mobile device is in a second network.

5. The mobile device of claim 3, wherein the home location register and the mobile device are within a first network.

6. The mobile device of claim 5, wherein the query causes the home location register in the first network to query a second home location register in a second network.

7. The mobile device of claim 1, the operations further comprising:
determining, based on the received roaming status, whether the mobile device is roaming or not roaming;
upon a determination that the mobile device is roaming, selecting a roaming access point name from the plurality of access point names; and
upon a determination that the mobile device is not roaming, selecting a nonroaming access point name from the plurality of access point names.

8. A network device comprising:
a processor; and
memory coupled to the processor, the memory comprising executable instructions that when executed by the processor, cause the processor to effectuate operations comprising:
providing a request for identifying information;
receiving, responsive to the request, identifying information;
determining, based on the received identifying information, a roaming status of a mobile device;
providing an indication of the determined roaming status;
receiving, responsive to providing the indication of the determined roaming status, a service request comprising an access point name; and
determining service parameters based on the access point name.

9. The network device of claim 8, the operations further comprising:
establishing a communications link based on the service parameters.

10. The network device of claim 8, wherein the identifying information comprises at least one of a mobile network code or a mobile country code.

11. The network device of claim 8, wherein the service parameters are determined via a query, comprising the access point name, to a home location register.

12. The network device of claim 11, wherein the home location register is in a first network and the network device is in a second network.

13. The network device of claim 11, wherein the home location register and the network device are within a first network.

14. The network device of claim 13, wherein the query causes the home location register in the first network to query a second home location register in a second network.

15. A computer-readable storage medium that is not a propagating signal, the computer-readable storage medium comprising executable instructions that when executed by a processor cause the processor to effectuate operations comprising:
providing a request for identifying information;
receiving, responsive to the request, identifying information;
determining, based on the received identifying information, a roaming status of a mobile device;
providing an indication of the determined roaming status;
receiving, responsive to providing the indication of the determined roaming status, a service request comprising an access point name; and
determining service parameters based on the access point name.

16. The computer-readable storage medium of claim 15, the operations further comprising:
establishing a communications link based on the service parameters.

17. The computer-readable storage medium of claim 15, wherein the identifying information comprises at least one of a mobile network code or a mobile country code.

18. The computer-readable storage medium of claim 15, wherein the service parameters are determined via a query comprising the access point name to a home location register.

19. The computer-readable storage medium of claim 18, wherein the home location register is in a first network and the network device is in a second network.

20. The computer-readable storage medium of claim 18, wherein the home location register and the network device are within a first network.

* * * * *